Sept. 15, 1925.

C. E. REED, JR 1,553,876

SPRING STRUCTURE

Filed April 10, 1923      2 Sheets-Sheet 1

Inventor:
Charles E. Reed, Jr.,
By Dyrenforth, Lee, Chritton & Wiles,
Attys.

Sept. 15, 1925.                         1,553,876
             C. E. REED, JR
             SPRING STRUCTURE
          Filed April 10, 1923    2 Sheets-Sheet 2
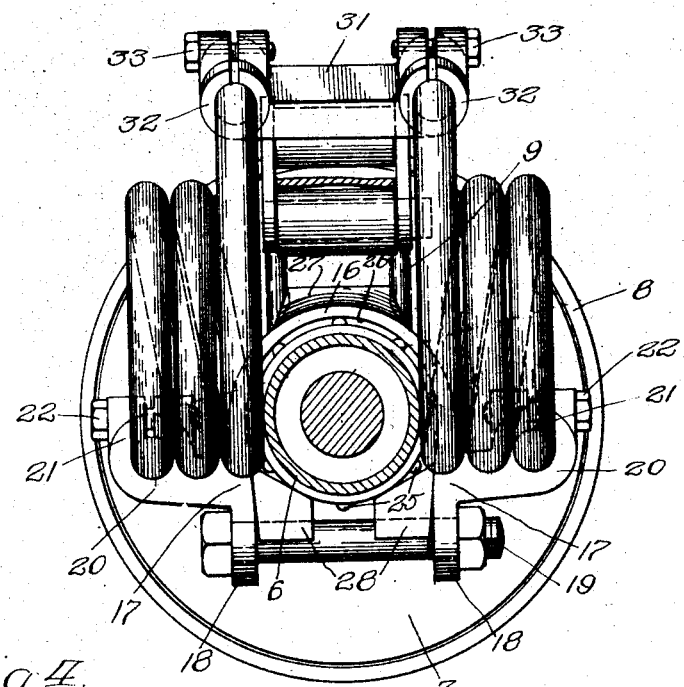
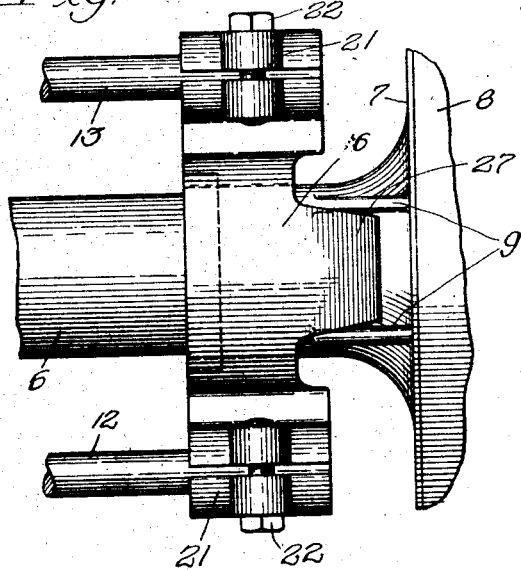
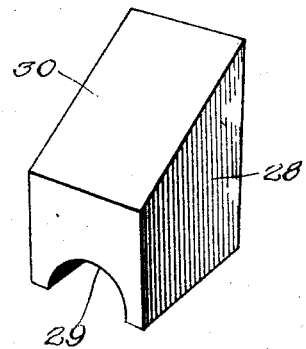
Inventor:
Charles E. Reed, Jr.

Patented Sept. 15, 1925.

1,553,876

UNITED STATES PATENT OFFICE.

CHARLES E. REED, JR., OF OAK PARK, ILLINOIS, ASSIGNOR TO CHARLES E. REED & CO., OF CHICAGO, ILLINOIS, A CORPORATION OF ILLINOIS.

SPRING STRUCTURE.

Application filed April 10, 1923. Serial No. 631,117.

*To all whom it may concern:*

Be it known that I, CHARLES E. REED, Jr., a citizen of the United States, residing at Oak Park, in the county of Cook and State of Illinois, have invented a new and useful Improvement in Spring Structures, of which the following is a specification.

My invention relates more particularly to spring structures for vehicles, my main object being to provide for a spring action supplementary to the action of the main spring through the medium of which the body is supported on the axle, to the end that shocks, due to the traveling over rough roads, will be absorbed in a manner to induce ease and comfort in riding.

It may be further stated that the invention has to do with the general type of spring structures wherein supplementary springs are provided in connection with the main spring of the vehicle and through the medium of which the main spring is connected with the axle of the vehicle.

Further objects of the invention are to provide a novel and simple arrangement for attaching the supplemental springs to the axle of the vehicle to the end that the supplemental springs shall be rigidly secured in position; to provide a construction in which the necessity for forming the ends of the springs with attaching eyes, the provision of which renders the springs subject to impairment, is avoided; to provide a novel and simple arrangement of supplemental spring devices whereby the desirable "snubbing" action may be effected to overcome objectionable rebound; and other objects as will be manifest from the following description.

Figure 1:
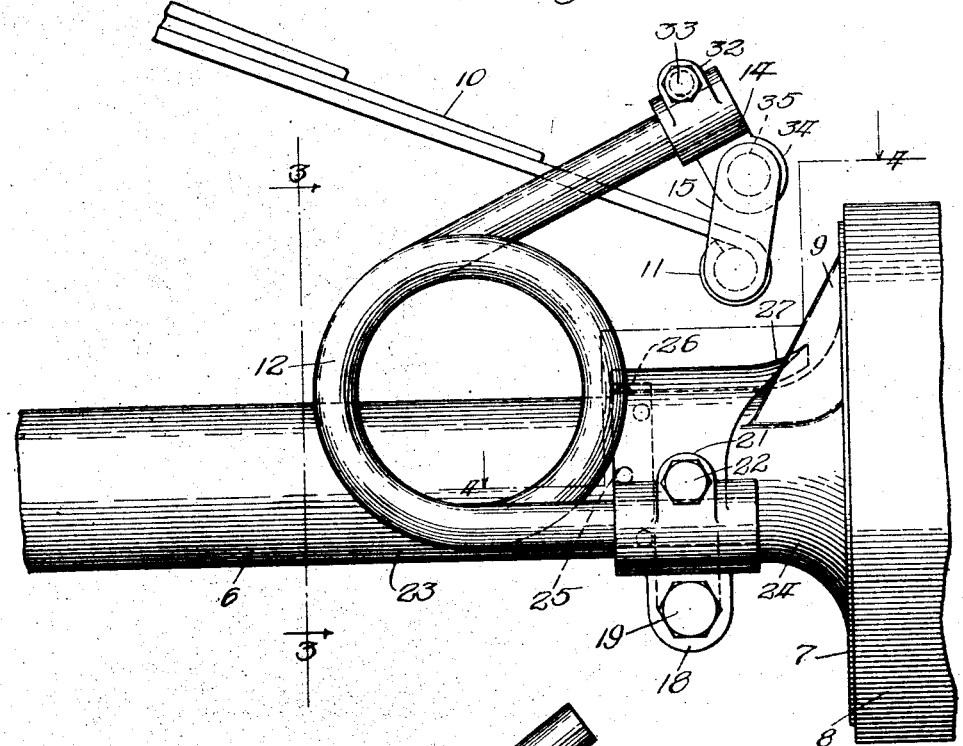
Figure 2:
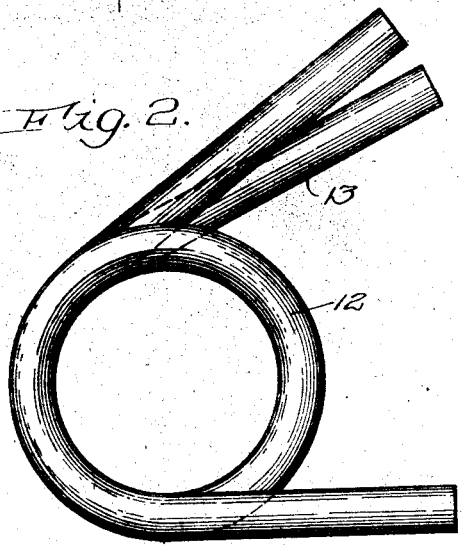

Referring to the accompanying drawings:

Figure 1 is a view in elevation of one end of the rear axle of a Ford automobile and the main supporting spring therefor, the same having incorporated therewith a supplemental spring device in accordance with my invention. Figure 2 is a view in elevation of the two coil spring elements of the portion of the structure shown in Fig. 1, one of these elements being a shock-absorbing element and the other a snubbing element, these elements being shown side by side and illustrated in the relative position they assume before assembly with the structure of Fig. 1. Figure 3 is a section taken at the line 3—3 on Fig. 1 and viewed in the direction of the arrows. Figure 4 is a section taken at the irregular line 4—4 on Fig. 1 and viewed in the direction of the arrow; and Figure 5, a perspective view of one of the two similar wedge blocks forming a part of the spring-attaching bracket.

Inasmuch as all of the features of my invention are applicable to the rear spring structure of a Ford automobile, certain features only thereof being applicable to the front spring structure thereof, I have chosen to illustrate it in connection with the rear spring structure, and as the supplemental spring structure and supporting means therefor are duplicated at opposite ends of the main spring and the stationary axle of the car, have illustrated one end only of the axle, and the main spring therefor.

In the arrangement shown the stationary rear axle of a Ford automobile is represented at 6, this axle being provided at opposite ends with enlargements, the one at one end only of the shaft being shown at 7, these enlargements being of circular shape and provided for supporting certain parts of the brake mechanism (not shown) which co-operate with the brake drums on the wheels adjacent thereto, one of these drums being shown at 8. The axle 6, as commonly provided, is formed at each end with a pair of parallel ribs 9 spaced apart and provided for the purpose of strengthening the heads 7. The rear main spring of the automobile and which is located directly above the axle 6, it being of leaf form and extending almost the entire length of the axle, is represented at 10, its opposite ends being formed with horizontal eyes, the one at one end only of this shaft being represented at 11.

My improved supplementary spring structure for the end of the spring shown in Fig. 1 and which would be duplicated for this spring at the other end thereof, comprises, generally stated, a pair of closed spiral springs 12 and 13 located substantially parallel with the axle 6 and located at opposite sides thereof, a coupling head 14 connected with the upper ends of the springs 12 and 13 and pivotally connected with a shackle 15 which latter in turn is pivotally connected with the eye of the spring 11, and a clip device 16 secured to the axle 6 and to which the lower ends of the springs 12 and 13 are connected.

The clip device 16 is formed of a U-shaped member 17 adapted to be applied to the axle 16 in straddling position thereon as shown in the drawings, the member 17 being provided at opposite sides thereof with depending lugs 18 which extend below the under side of the axle 6 and through which a bolt 19 for drawing together the opposed leg portions of the clip 17 extend, the body member being also provided with laterally-extending lugs 20 terminating in substantially horizontally disposed split socket portions 21 equipped with the clamping screws 22. As is common in axle constructions of this type, the axle 6 is formed of a central section 23 and end sections 24 (one only of which is shown) on which the heads 7 are formed, these end sections being secured to the central section 6 through the medium of rivets 25. The clips 16 are secured to the axle to overlap the joints between the sections 6 and 24, and to this end are recessed, as represented at 26, to receive these rivets, the opposite ends of the clips being provided with the outwardly-extending lugs, the one for the clip shown being represented at 27, which extend into the spaces between the ribs 9 as shown more particularly in Fig. 4. The fastening means for the clip comprise, in addition to the bolt 19, a pair of wedge blocks 28 shown as grooved along their lower surfaces, as represented at 29, at which portions they fit over the bolt 19 between the lugs 18, the upper surfaces of these wedge blocks being inclined, as represented at 30, the blocks being so arranged that the surfaces 30 converge downwardly and at which portions these blocks bear against the under side of the axle 6, and when the bolt 19 is tightened to secure the clip in place, these blocks operating to firmly wedge the clip member 18 against vertical movement. It will be understood from the foregoing that a clip constructed as described is not only firmly secured against vertical movement, as stated, but it is firmly held against rotation on the axle and against creeping in either direction along the shaft.

The split sockets 21 afford points of connection for the lower ends of the springs 12 and 13, these ends of the springs being inserted into the sockets and tightly clamped therein by turning up the screws 22.

The clip 14 is shown as formed of a bar portion 31 presenting at its opposite ends the split socket portions 32 in which the upper ends of the springs are insertable and in which the latter are firmly secured by turning up the clamping screws 33 engaging the opposite split portions of these sockets. The bar portion 31 is provided with a depending lug 34 pivotally connected at 35 with the shackle 15 which is shown as of common construction.

In the particular construction illustrated the springs 12 and 13 are of identically the same construction except that the ends of the springs 13 extend at a lesser angle to each other than the ends of the spring 12.

It is preferred, though not necessary in carrying out my invention, that the springs 13 be of such form and present such tension, that they will be under little, if any, tension under the load imposed by the empty body of the vehicle. Thus when the vehicle is traversing rough roads both of the springs 12 and 13 at each end of the axle 6 will be placed under tension and supplement the action of the main spring 10, as will be manifest, to absorb shocks. The springs 13, when the spring structure rebounds, move to a normal position in which they are not under tension, before the springs 12 have assumed such condition, and thus, as the rebound continues, the upper ends of the springs 13 are caused to be moved upwardly against the tension of these springs and a snubbing action is produced.

The provision of the split sockets for supporting the springs at their ends, the ends of the springs being unprovided with eyes, is of great practical advantage in structures of this character, inasmuch as the springs with eyes have proven very troublesome because of breakage at these eye portions. The use of the split clamps not only dispenses with the need of performing the operations necessary to produce the eyes on the ends of springs, which is expensive, but also renders the structure very much less liable to impairment than where the eyes are provided.

Furthermore, it will be noted that by providing an arrangement of leaf spring and supplemental coil spring, whereby the end of the leaf spring, adjacent the coil spring, and the arm of the coil spring which is operatively connected with this end of the leaf spring, extend in inclined relation to the horizontal plane as shown, practically no tendency to the slipping of the clamp 14 on the upper arm of the coil spring, exists and, therefore, this end of the arm may be left plain. Inasmuch as there is thus no tendency of the coil spring 12 to bodily move in the direction of the length of the axle 23 by reason of the arrangement of the springs, as stated, the provision of the lower arm of the coil spring 12 as a horizontal arm creates no tendency of this arm to move lengthwise in the clamp 18 and thus the outer end of this lower arm may be left plain.

It will be understood that certain features of my invention are readily applicable to the front spring structure of the car and in so far as they are applicable it is my intention to claim them, regardless of the location of the spring structure.

While I have illustrated and described a particular embodiment of my invention, I do not wish to be understood as intending to limit it thereto as the same may be variously modified and altered without departing from the spirit of the invention.

What I claim as new, and desire to secure by Letters Patent, is:

1. In a vehicle, the combination with its axle and body, of a spring interposed therebetween, a clip presenting spaced apart portions at which it straddles said axle, a bolt extending beyond the axle from one to the other of said portions of said clip, wedge means engaging said axle and clamping said clip to said axle under the clamping action of said bolt, and a supplemental spring device operatively engaging an end of said spring and said clip.

2. In a vehicle, the combination with its axle and body, of a spring interposed therebetween, a clip presenting spaced apart portions at which it straddles said axle, a bolt extending beyond the axle from one to the other of said portions of said clip, a pair of wedge blocks having oppositely-directed wedge-faces and located between said portions of said clip and bearing at said wedge-faces against said axle, and a supplementary spring device operatively engaging an end of said spring and said clips.

3. In a vehicle, the combination with its axle and body, of a spring interposed therebetween, a clip presenting spaced apart portions at which it straddles said axle, a bolt extending beyond the axle from one to the other of said portions of said clip, a pair of wedge blocks located between said portions of said clip and bearing against said axle and recessed to straddle said bolt, and a supplementary spring device operatively engaging an end of said spring and said clip.

4. In a vehicle, the combination with its body and axle carrying an expanded head provided with ribs spaced apart, of a spring interposed between said body and axle, a clip presenting spaced apart portions at which it straddles said axle, a bolt engaging said portions of the clip and extending below said axle, said clip having a portion extending between said lugs for preventing rotation of said clip on said axle, and a supplementary spring device operatively engaging said clip and spring.

5. In a vehicle, the combination with its body and axle having an expanded head provided with ribs spaced apart, of a spring interposed therebetween, a clip presenting spaced-apart portions at which it straddles said axle, a bolt engaging said portions of said clip and extending below said axle, wedge means interposed between said portions of said clip and said axle and bolt, said clip having a portion which extends between said ribs and prevents rotation of said clip on said axle, and a supplemental spring device operatively engaging said spring and clip.

6. In a vehicle, the combination with its body and axle having an expanded head provided with ribs spaced apart, said axle being formed of alining sections secured together and radially-extending fastening devices exposed at the outer surface of the axle, of a spring interposed between said body and axle, a clip presenting spaced apart portions at which it straddles said axle, said clip presenting an outwardly-facing shoulder co-operating with said fastening devices to form a stop limiting movement of the clip on the axle lengthwise of the latter, said clip having a portion which extends between said ribs and prevents rotation of said clip on said axle, a bolt engaging said portions of said clip and extending below said axle, wedge means interposed between said portions of said clip and clamping said clip to said axle under the clamping action of said bolt, and a supplemental spring device operatively engaging said spring and clip.

7. In combination, two relatively movable members and spring means therebetween formed of curved spring elements operatively engaging at their ends with said members, one of said elements being a shock absorber and the other a snubber element, the curved portions of said elements extending in planes which extend in the direction of relative movement of said members, said spring elements being so constructed and arranged that said snubber element exerts resistance to relative movement of said members in a direction away from each other, while the other of said elements is exerting a force tending to move said members apart in the relative movement of said members under rebound.

8. In combination, two relatively movable members and spring means therebetween formed of closed coil springs operatively engaging at their ends with said members, one of said coil springs being a shock absorber and the other thereof a snubber element, said coil springs being located side by side with their axes extending crosswise of the direction of relative movement of said members, said coil springs being so constructed and arranged that said snubber spring exerts resistance to relative movement of said members in a direction away from each other while the other of said coil springs is exerting a force tending to move said members apart in the relative movement of said members under rebound.

9. In a vehicle, the combination with its body and supporting structure, of a leaf spring interposed between said body and supporting structure with an end thereof inclining relative to the horizontal plane, and a supplementary coil spring with its axis extending crosswise of said leaf spring and located between the ends of said leaf spring, said coil spring having outwardly-extending arms extending generally in the direction of the length of said leaf spring, said coil spring being connected at one of its arms with said supporting structure, the other arm of said coil spring operatively engaging said inclining end of said leaf spring and, in the normal condition of the vehicle structure, inclining relative to the horizontal plane in a direction opposite to that in which said end of said leaf spring inclines.

10. In a vehicle, the combination with its body and supporting structure, of a leaf spring interposed between said body and supporting structure with an end thereof inclining relative to the horizontal plane, a supplementary coil spring with its axis extending crosswise of said leaf spring and located between the ends of said leaf spring, said coil spring having outwardly-extending arms extending generally in the direction of the length of said leaf spring, one of said arms extending substantially horizontally and at which said coil spring is connected with said supporting structure, and a shackle connecting the other arm of said coil spring with said inclining end of said leaf spring, said last-referred-to arm, in the normal condition of the vehicle structure, inclining relative to the horizontal plane in a direction opposite to that in which said end of said leaf spring inclines.

11. In a vehicle, the combination with its body and supporting structure, of a leaf spring interposed between said body and supporting structure with an end thereof inclining relative to the horizontal plane, a supplementary coil spring with its axis extending crosswise of said leaf spring and located between the ends of said leaf spring, said coil spring having outwardly-extending arms extending generally in the direction of the length of said leaf spring, said coil spring being connected at one of its arms with said supporting structure, the other arm of said coil spring extending in intercepting relation to the inclining end of said leaf spring and operatively engaged with said inclining end, and in the normal condition of the vehicle structure extending at an angle to the horizontal plane.

12. In a vehicle, the combination with its body and supporting structure, of a leaf spring interposed between said body and supporting structure with an end thereof inclining relative to the horizontal plane, a supplementary coil spring with its axis extending crosswise of said leaf spring and located between the ends of said leaf spring, said coil spring having outwardly-extending arms extending generally in the direction of the length of said leaf spring, said coil spring being connected at one of its arms with said supporting structure, the other arm of said coil spring extending in intercepting relation to the inclining end of said leaf spring, and a shackle connecting said last-referred-to arm with said inclining end of said leaf spring, adjacent their outer extremities, beyond the point of their intersection, said last-referred-to arm of said coil spring, in the normal condition of the vehicle structure extending at an angle to the horizontal plane.

13. In a vehicle, the combination with its body and supporting structure, of a leaf spring interposed between said body and supporting structure with an end thereof inclining relative to the horizontal plane, and a supplementary coil spring with its axis extending crosswise of said leaf spring and located between the ends of said leaf spring, said coil spring having outwardly-extending arms extending generally in the direction of the length of said leaf spring, one of said arms extending substantially horizontally and at which said coil spring is connected with said supporting structure, the other arm of said coil spring operatively engaging said inclining end of said leaf spring and, in the normal condition of the vehicle structure, inclining relative to the horizontal plane in a direction opposite to that in which said end of said leaf spring inclines.

CHARLES E. REED, Jr.